Patented Sept. 27, 1938

2,131,338

UNITED STATES PATENT OFFICE 2,131,338

CONSOLIDATION OF POROUS MATERIALS

James G. Vail, Media, Pa., assignor to Philadelphia Quartz Company, Philadelphia, Pa., a corporation of Pennsylvania No Drawing. Application December 23, 1935, Serial No. 55,919

3 Claims. (Cl. 61—36)

This invention relates to consolidation of porous materials; and it comprises a method of consolidating or solidifying porous materials, such as porous natural earth strata, for example, wherein such a material is impregnated with an unstable siliceous colloidal liquid having an alkaline reaction in the state of incipient gel formation, and the said liquid is allowed to gel in situ; all as more fully hereinafter set forth and as claimed.

In all the many building and construction activities wherein it is necessary to excavate earth, the problem is always present of consolidating porous earth in order to prevent slides, cave-ins and the seepage of water. This problem is encountered more particularly in the digging of ditches and tunnels and the drilling of wells. Several different types of porous earth are encountered which cause difficulties, such as the so-called quicksand, sand, gravel, porous rock of all kinds, earth fills and other artificially produced porous strata. In all cases the problem is to consolidate or solidify the earth in order to render the same firm and immobile and to increase its load bearing capacity. Usually it is also desired to render the earth impervious to water.

Several attempts have been made to solve the problem as outlined. It has been proposed, for example, to drive perforated pipes, suitably spaced, into the area to be solidified and to pump through these pipes suspensions of Portland cement and water, and to permit the cement to set in situ. But it has been found that the porous earth filters out the suspended cement and impedes penetration, thus limiting the applications of this method. It has also been proposed to similarly pump into such porous earth solutions of salts and other fluids which are capable of reacting together with the formation of solids, these solids tending to fill the voids. This latter method has the advantage that fluids rather than suspensions are pumped, but suffers the disadvantage that the tubes used to inject the fluids must be set relatively close together in order that the porous mass may be satisfactorily permeated. This greatly increases the cost of this method since the expense of placing the tubes represents an important item. When two fluids are used mixing is incomplete and the solid product tends to form in layers with intermediate areas of unreacted material through which water may pass freely. Such layers also act as cleavage planes.

I have found that these difficulties are readily overcome by the use of a single unstable siliceous colloidal fluid of alkaline reaction in the state of incipient gel formation, the said fluid being capable of setting to a firm gel in situ. By this means more uniform penetration is secured and at less cost. The consolidating fluid (sol) may be so constituted that it will set to a gel within a predetermined time interval, this time interval being sufficient to enable penetration to the desired extent. The fluid can be forced into place in the pore structure of the sand, gravel, porous rock or other material where it will solidify on standing without the addition of any secondary material of reaction.

The advantages of my method are that a single liquid is employed which can be readily pumped and which is capable of rapid penetration through porous strata without substantial change in properties. Injection of this liquid can be accomplished by means of perforated tubes spaced at some distance apart. The spacing required is not as close as in prior art methods, this resulting in an important saving in cost. The composition of the liquid, as placed, is substantially uniform and a uniform sealing effect is therefore produced. My method is flexible since the composition of the colloidal liquid can be adjusted to the particular conditions encountered in practice. The colloidal liquids can be adjusted so that gelation is delayed over periods of 30 minutes or longer, during which period the liquid can be pumped freely under a high pressure head if desired producing penetration to considerable distances.

Without limiting myself to any particular compositions or components in my consolidating liquids, I have found that, in general, compositions which eventually result in the formation of the so-called artificial zeolites are well suited for my purpose. Many liquid compositions have been described in the art which, when freshly mixed, are in the nature of inorganic colloidal solutions of alkaline reaction and which, upon standing, set to full-volume alkaline gels and eventually to hard artificial zeolites, these zeolites being commonly employed in the water softening art. I have found that any of these liquid compositions can be employed which have the properties of setting in situ, to relatively rigid gels without the addition of extraneous substances. It is advantageous, of course, that compositions be employed which remain for some time in the sol state, in order that plenty of time may be afforded for manipulation and injection. Control of the time of setting may be accomplished in various ways, by dilution or control of pH, for example. It is also possible to delay gelation to a considerable extent by mere agitation of these liquids. Choice of the particular colloidal liquid to be employed and methods for obtaining the required control of concentrations and the like can be readily determined by test.

Compositions which I have found to be particularly suitable for my method may be produced by employing a soluble alkali metal silicate solution containing, preferably but not necessarily, more than two moles of silica to one mole of alkali metal oxide. Solutions of these silicates, within certain concentration ranges, can be made unstable without immediate gelation by the addition of alkaline reactants such as alkaline aluminates, etc. If the concentrations are too high immediate precipitation may take place, which renders the materials unsuited to the practice of my invention. But within certain concentration ranges immediate gelation can be avoided and the mixed solutions can be handled while in liquid state for considerable periods of time, during which they can be pumped and injected into porous strata.

In order that the gel ultimately formed in the porous stratum shall be as firm and strong as possible, it is advantageous to select combinations which remain liquid for the necessary time without too large an addition of water. This is desirable for the reason that the strata to be solidified are often filled with water which tends to dilute the unstable liquid with which it is desired to replace the water. The ultimate strength of the gel is greater, in general, the greater its solid content.

I have found that sodium aluminate forms a particularly advantageous gelling agent when added to sodium silicate solutions. In making up one specific composition for use in my method I employed the so-called "N" Brand silicate of soda solution, containing about 8.9 per cent $Na_2O$ and 29 per cent $SiO_2$ and having a gravity of about 41° Baumé. 4,500 parts by weight of this solution were first mixed with an equal weight of water. I then separately made up a second solution from the so-called KWS #2 sodium aluminate solution. 383 parts by weight of this aluminate solution were diluted with 2,640 parts by weight of water, the resulting solution containing about 2.4 per cent of $Na_2O$ and 2.5 per cent $Al_2O_3$. The two solutions, made up as stated, were then quickly mixed together and the resulting colloidal liquid was pumped into a bed of moist sand. It was found that this liquid could be pumped for a period of over 30 minutes and that it penetrated the sand almost as readily as water. After this time an increase in the viscosity of the liquid was noted and pumping became more difficult. After the expiration of about an hour the entire mass set up into a firm gel. The sand into which the solution had been pumped was found to be solidified and capable of resisting the penetration of water. It was found able to support a hydrostatic head of several feet for a period of many weeks, this head not representing the limit of water pressure the consolidated sand was capable of withstanding. In these tests it was found that pumps and injecting tubes could be cleared of the gel-forming material before gelation by pumping water through them in amount only sufficient to displace this material.

In another practical test a similar mixture of solutions of sodium silicate and sodium aluminate was pumped into a water-bearing natural sand having an over-burden of six feet of moist sand. The mixed solution forced out the natural water and in the course of approximately one-half hour, set up to a firm jelly which permeated the sand and permitted a ditch to be excavated through the water-bearing stratum as a perfectly dry operation. It was found that shoring of the sides of the ditch could be largely dispensed with in this operation owing to the firm nature of the consolidated sand. Water was completely excluded from the ditch although under a considerable hydrostatic pressure.

The alkaline gels of the present invention, which are usually produced by mixing a sodium silicate solution with the solution of an alkali metal salt of an amphoteric metal, are superior to the acid gels which have been suggested previously in the art, these acid gels being produced by mixing mineral acids, for example, with sodium silicate solutions. The acid gels set much more rapidly and the texture of the resulting gel is less firm. Acid gels can be employed in practice only when the hydrostatic head to be overcome is low.

The adaptations of my method are many and various. It is frequently possible to block off water from oil wells, that is, to prevent the infiltration of water into such wells, by a suitable adaptation of my method. Water penetration into mines may be brought under control. Tunnel heads can be solidified and excavated more cheaply than by freezing. Consolidated blocks of earth can be employed as a foundation into which piling can be driven or the earth around driven piles can be consolidated. Porous castings, cement blocks and sand molds can be improved. Many other industrial adaptations will be apparent to those skilled in the art.

While I have specifically described what I consider to be several of the best embodiments of my method, there are many other modifications which fall within the broad scope of my invention. As stated previously, the consolidating liquids of my invention can be made from the liquid components employed in making the usual alkaline artificial zeolites which have been described in the art. In all cases, in the production of such zeolites, wherein it is possible to produce a preliminary sol stage, which is sufficiently permanent to permit pumping and injection before final gelation, the sol can be employed as a consolidating liquid. In cases where gel formation is slow it is possible to pump and inject a weak gel before it has developed its full set, allowing it to re-set in situ. It is advantageous to employ liquids which set to full-volume jellies. Examples of solutions which can be mixed with alkali metal silicate solutions in suitable proportions, concentrations and at certain alkalinities to produce operative consolidation liquids are sodium dichromate, amino-copper compounds, sodium bicarbonate, borax, alkali metal, salts of amphoteric metals, etc. Sodium, potassium and other alkali metal silicate solutions may be mixed with these compounds.

Control of the speed of setting of the consolidating liquids can be controlled partly by control of temperature. With sols of the zeolitic type, for example, the rate of gelation is increased by rise in temperature.

Various ways can be employed within the scope of my invention to impregnate porous materials. In some cases it is possible to simply pour the consolidating liquid on the material to be consolidated, for example. Cement blocks can be dipped into the liquids. And of course the range of porous materials which can be impregnated covers all such materials which it is possible to impregnate with a liquid in the state of incipient gel formation. Many other modifications within the scope of the following claims will be immediately evident to those skilled in the art.

What I claim is:

1. In the consolidation of porous materials, the process which comprises mixing a solution of sodium silicate, containing not substantially less than 2 moles of silica to one mole of sodium oxide, with a solution of sodium aluminate, the concentrations of said solutions being adjusted to produce, upon admixture an unstable dilute liquor, setting to a full volume alkaline gel within a period of the order of 30 minutes, impregnating a porous material with said unstable liquor prior to setting and gelling said mixture in situ.

2. In the consolidation of porous earth strata, the process which comprises mixing a solution of an alkali metal silicate, containing not substantially less than 2 moles of silica to one mole of alkali metal oxide, with a solution of an alkali metal aluminate, the proportions and concentrations of said solutions being adjusted to produce, upon admixture, an unstable dilute liquor setting to a full volume alkaline gel only after a substantial period of time, impregnating porous earth with the freshly mixed liquor prior to setting and gelling said mixture in situ.

3. The method of claim 2 wherein the porous earth impregnated with the unstable liquor is adjacent an oil well, the resulting impregnation preventing the infiltration of water into said well.

JAMES G. VAIL.